April 3, 1951  F. O. HESS  2,547,755
BILLET HEATING

Filed July 29, 1947  8 Sheets-Sheet 1

Fig. 1.

INVENTOR
FREDERIC O. HESS
BY
John E. Hubbell
ATTORNEY

April 3, 1951 F. O. HESS 2,547,755
BILLET HEATING
Filed July 29, 1947 8 Sheets-Sheet 4

INVENTOR
FREDERIC O. HESS
BY
Joan E. Hubbell
ATTORNEY

April 3, 1951  F. O. HESS  2,547,755
BILLET HEATING
Filed July 29, 1947  8 Sheets-Sheet 7

INVENTOR
FREDERIC O. HESS
BY
John E. Hubbell
ATTORNEY

Patented Apr. 3, 1951

2,547,755

UNITED STATES PATENT OFFICE 2,547,755

BILLET HEATING

Frederic O. Hess, Philadelphia, Pa., assignor to Selas Corporation of America, Philadelphia, Pa., a corporation of Pennsylvania Application July 29, 1947, Serial No. 764,443

4 Claims. (Cl. 263—6)

The general object of the present invention is to provide an improved method of, and improved means for heating metal bars to forging and rolling temperatures. The invention is primarily devised for, and is of a special utility, in heating steel billets to the forging and rolling temperatures within the range of 1800° F. to 2300° F. However, the general principles of the invention are well adapted for use in heating bars of aluminum, copper, and other metals to temperatures lower than those mentioned above. Practically important objects of the invention are to provide a method of, and means for continuously heating metal bars moving in a stream through a heating chamber, more rapidly and more efficiently than is possible with prior apparatus for continuously heating such bars, and for heating individual bars in the stream to different temperatures.

In the preferred form of the present invention, a stream consisting of bars arranged side by side, is moved through an elongated heating chamber in which the bars are subjected to independently regulable heating effects at different points. In the ordinary practice of the invention, bars are added to the row, one at a time, at the end of the row adjacent the inlet end of the heating chamber, and are separated from the other end of the row, one at a time, at or adjacent the delivery end of the heating space. The inlet end of the heating chamber may be at either end of the chamber as conditions make desirable. As each bar is separated from the delivery end of the stream or row of bars, the remaining bars in the row are advanced toward the delivery end of the space by a distance equal to the thickness of the bar separated.

In practically desirable forms of the invention, the bars are horizontally disposed side by side, one above another in a vertical row, with each intermediate bar in contact with the two adjacent bars. When the movement of the stream of bars through the heating space is vertical it may well be downward in some cases, and upward in other cases.

The invention is adapted for use in heating metal bars varying widely in dimensions. Thus, for example, the invention may be used in a heating furnace adapted to heat bars of a cross-sectional area as small as two square inches or so, and a length of less than two feet, and may be used in a heating furnace adapted to heat bars having a cross-sectional area of one square foot and a length of sixteen or more feet. The bars heated may be round or square or have other cross-sections.

In heating bars in accordance with the present invention, each bar may be gradually heated to a delivery temperature varying with the composition of the bar and at rates which may be varied as the demand for the heated bars varies with the conditions of plant operation, without requiring any of the bars to be held at or near its maximum temperature for an objectionably long period.

In the preferred form of the invention, the billet heating apparatus comprises a multiplicity of vertically and horizontally distributed and separately regulable furnace wall burners, mounted in the side walls of the heating chamber. Each such burner is preferably of a type in which combustion of the fuel burned is substantially completed within combustion spaces in the furnace walls, and in such manner that a large portion of the heat liberated is radiated to the stream of metal bars moving through the heating chamber.

Fuel burning billet heating furnaces heretofore in common use have been of two general types, namely, the intermittent or batch heating type, and the continuous heating type in which billets are progressively advanced in a generally horizontal direction through an elongated furnace chamber. It has long been recognized that in plants in which there is a more or less continuous demand for hot billets, continuous billet heating furnaces are generally preferable to batch heating apparatus. Continuous billet heating apparatus now in general use are of two forms. In one of said forms, the billets are progressively advanced through an elongated heating chamber between billet receiving and billet discharging stations on a movable hearth which is usually a rotary hearth. In the second form of continuous billet heating furnaces, the billets are progressively pushed or caused to roll through an elongated heating chamber while supported on stationary guides or track rails. In many cases the said guides or rails are inclined at a slight angle to the horizontal, so that the billets have a relatively small gravitational tendency to roll along the track rails from the entrance end to the exit end of the heating chamber.

The latter may be sixty or seventy feet long, and when charged with steel billets of an average diameter of ten inches, the furnace charge consists of some seventy to eighty billets. Such a furnace can discharge heated billets at the rate of from nine to sixteen per hour, depending on the billet heating time which may vary from five to eight hours. In the operation of such a furnace, the average scale loss is not less than about five percent, and may be as high as eight percent of the weight of the billets heated. Thus, a billet which weighs 6000 pounds when passed into the furnace will weigh not more than about 5700 pounds when discharged from the furnace. If such billets are being heated at the rate of ten an hour, the direct scale loss amounts to a billet steel waste of a ton and a half an hour. In addition to the direct steel wastage, scale loss increases the fuel and operating costs of the billet heating furnace, per ton of hot billets discharged from the furnace. Billet heating furnaces of the form last mentioned, are also open to the objection that with their slow rotative movements on the inclined track rails, the billets tend to adhere to one another and thus cause temporary interruptions in the furnace output from time to time, as well as increasing the scale loss and labor cost of operation.

Large, continuous billet heating furnace units of the rotary hearth type are operable to heat billets in about half the time, and with about half the scale loss, characteristic of billet heating furnaces of the inclined track type. But rotary hearth furnaces of large capacity are bulky and costly to construct. For example, one such rotary hearth billet heating furnace now in process of construction and designed to heat ninety tons of billets per hour, is ninety feet in diameter. Such a furnace requires the use of expensive apparatus to properly place the billets on, and to remove them from the rotary hearth.

Many modern metal working processes require various metallurgical characteristics of the material being worked upon that cannot be obtained with billets that have been heated for long periods of time in conventional furnaces. It is believed that changes in the crystalline structure within the metal takes place with a consequent loss of fluidity as a result of the long heating period that renders the metal unsuitable for thees processes. In any event, the rapid heating of billets possible with a furnace embodying this invention produces a metallurgical structure in the billets that permits them to be used in processes where the same billet could not be used if it was heated slowly. The end products made from rapidly heated billets also have superior metallurgical and mechanical qualities which are directly related to the speed with which the billet was heated.

A billet heating furnace constructed in accordance with the present invention and of a large, but not abnormally large output capacity, is adapted to heat a stream of four ton billets with a heating period for each billet of about one hour, and with a scale loss of not more than one percent. Furthermore, the bulk and inherent construction and operation cost of such a furnace are substantially smaller respectively than the bulk and inherent construction and operating cost of a rotary hearth billet heating furnace of the same capacity. The reduction in the time required to heat a billet which the invention makes possible, directly contributes to a reduction in the scale loss, and to a desirable steel grain structure.

An advantage of a furnace of the type herein disclosed is the ability to change quickly the rate of work heating in the furnace as a whole or in various portions thereof. This permits the successive heating in the same furnace of billets of different types and having different heat requirements. The ability to heat rapidly and in quick succession small lots of material according to different heat schedules cannot be under-estimated.

It is an object of the invention, therefore, to provide a furnace that may be used to heat rapidly and in accordance with some predetermined schedule billets of various sizes. A further object of the invention is to provide a furnace whose heating characteristics may be changed readily to accommodate different types of billets and heat them according to different schedules.

A further object of the invention is to provide a billet heating furnace that will heat the billets so quickly that the grain structure of the metal will not be substantially affected during the heating process. Another object is to provide a furnace in which metal objects may be heated so rapidly that the scale loss during the heating period is negligible.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 1:
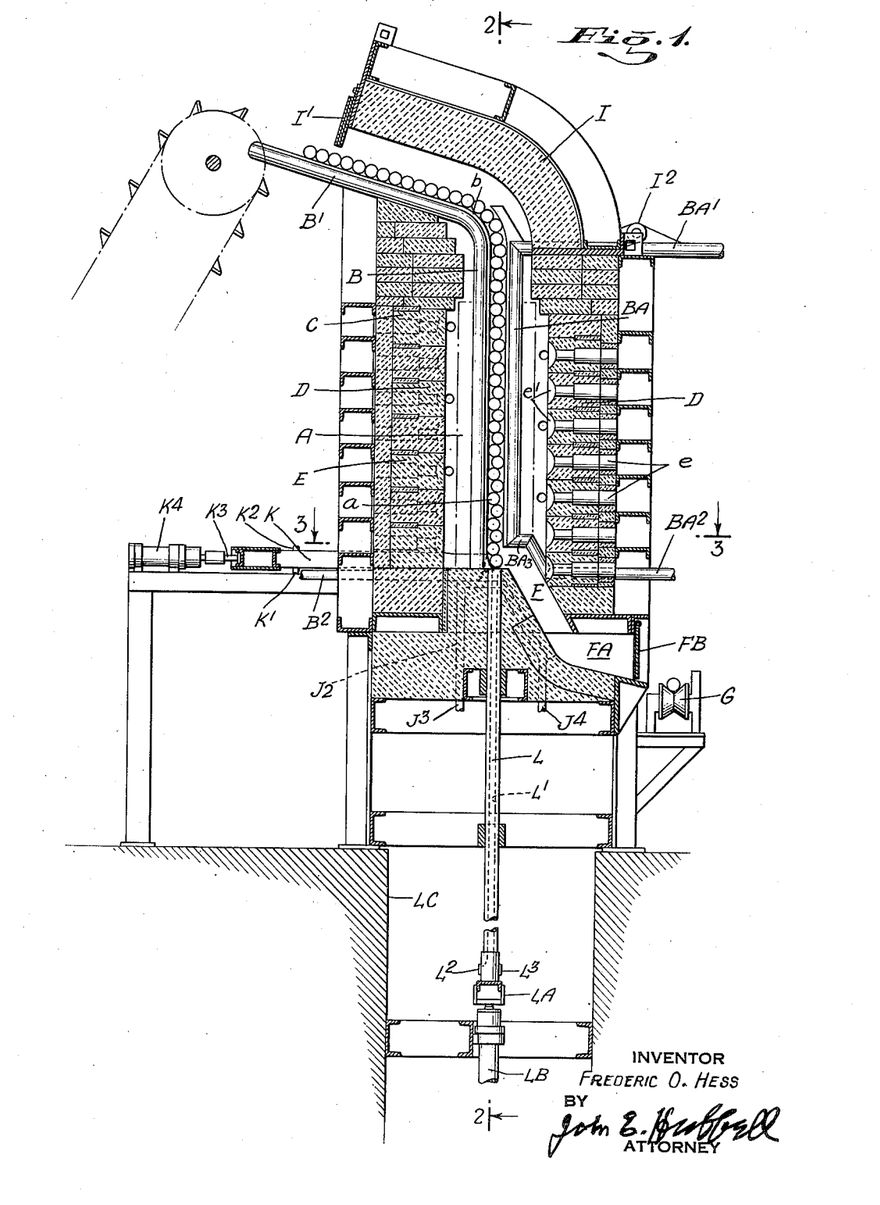
Fig. 1 is an elevation of a billet heating furnace in section on the line 1—1 of Fig. 3.
Figure 2:
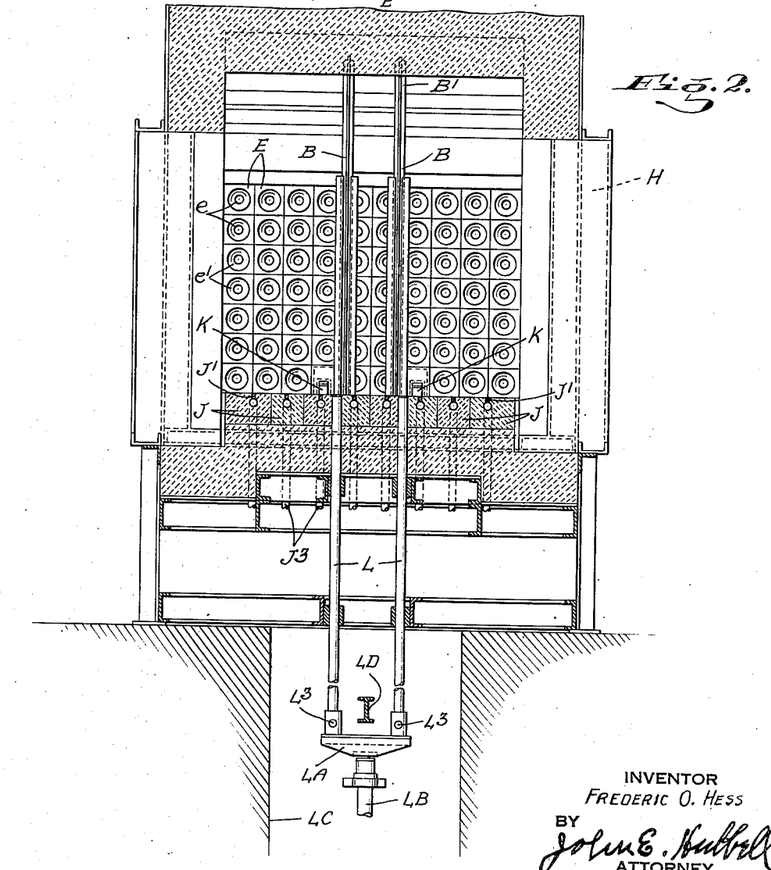
Fig. 2 is a sectional elevation on the line 2—2 of Fig. 1.
Figure 3:
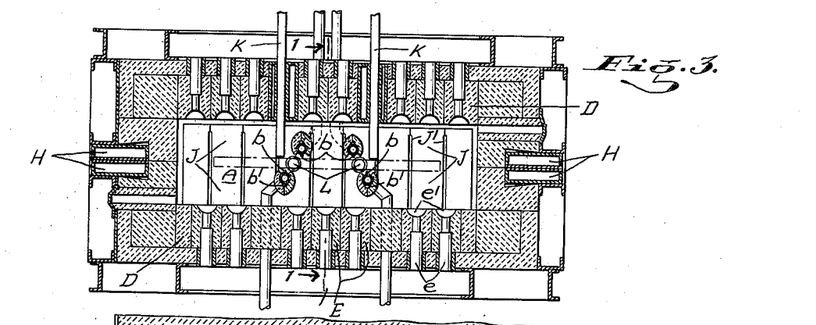
Fig. 3 is a plan section on the line 3—3 of Fig. 1.

The billet heating furnace shown in Figs. 1, 2 and 3 comprises a vertical heating chamber A in which a vertical row of superposed, parallel, horizontal billets $a$ is held between vertical guides B and BA at the opposite sides of the row of billets. Each of said guides is in the form of a stiff metal tube through which a cooling fluid, ordinarily water, is caused to flow, and the portion of each of the tubes B and BA within the furnace heating chamber A is partially encased by a shell C of refractory material. The chamber A is heated by furnace wall burners $e$ horizontally disposed in ceramic block E forming the refractory body portion of each of the two side walls D of the chamber A.

The flow of cooling water through the guide tubes B and BA is effected by circulating provisions external to the furnace proper. Since those provisions may be of any usual or suitable form, they need not be illustrated or described herein. As shown, there are two billet guide tubes B, one at each side of the vertical plane transverse to the billets passing centrally through the furnace chamber A. Similarly, there is a guide tube BA at each side of said plane. As shown, each of the guide tubes B and BA is nearer to said central plane than to the adjacent end wall of the chamber A, though this is not essential. Each of the tubes B and BA is formed with an external longitudinal rib or vane $b$ at its side adjacent the billets, through which the tube directly engages the billets. Each tube B and BA is also shown as provided with an external longitudinal rib $b'$ at its side remote from the billets. The ceramic shells or casings C for the tubes B and BA may be in the form of specially formed firebricks or blocks of ceramic material which are shaped to expose a longitudinal portion of each guide at its side adjacent the billets, so that the billets engage said ribs and not the ceramic material C. The ceramic material C reduces the heat absorption by the tubes B and BA, and thus reduces the amount of cooling liquid which must be passed through the tubes to prevent the latter from being dangerously overheated. Advantageously, and as shown, the ceramic material C is thickened at the side of each tube adjacent the corresponding side wall of the furnace chamber.

The tube ribs $b$ which engage the billets and space the body of the corresponding tubes away from the billets, minimize the transfer of heat by conduction from the billets to the bodies of the guide tubes, and thus advantageously reduce the local billet cooling action and the guide tube heating action resulting from the billet and tube engagement. The guide ribs $b$ contribute to the maintenance of the refractory shell material in the proper position on the ribs B and BA. Each of the ribs $b$ and $b'$ contributes materially to the stiffness of the corresponding guide tube in the direction required to withstand lateral pressure exerted against the guide tubes by the billets. As is indicated in Fig. 1, the horizontal width of the guideway formed by the tubes B and BA is greater than the normal or average width of the billets $a$ passing through the guideway. This is desirable not only because billets may not be of uniform thickness or diameter, but also because it means that each billet will ordinarily be in contact with the water cooled guides at one side only of the billet pathway, as is made clearly apparent in Fig. 1. Thus, there is less tendency to the development of billet "cold spots," than would exist if each billet were in engagement with water cooled guides at each side of the billet pathway.

While the vertical body portions of the guide tubes B and BA are shown as similar, their end portions are differently shaped and disposed. The upper end portion B' of each guide B is inclined away from the vertical to the left, as seen in Fig. 1, at an angle of 75° or so. The two tube portions B' thus form track rails along which horizontally disposed billets to be heated may roll down into the upper end of the billet guideway between the vertical portions of the guide tubes B and BA. The billets may be fed onto the inclined guide portions B' by a belt conveyor mechanism as indicated, or in any other suitable manner.

The lower end portion $B^2$ of each tube B is shown as bent to extend horizontally away from the center of the furnace at a level below the heating chamber A toward and away from the left hand side of the furnace as seen in Fig. 1. Each guide BA has a horizontal upper end portion BA' which extends through the furnace wall at the right hand side of the chamber A as seen in Fig. 1, at a level appreciably above the uppermost burners mounted in the side wall D, as hereinafter described. Each guide tube BA has a transverse lower end portion $BA^2$ which extends horizontally through and away from the right hand furnace wall D. The horizontal lower end portion $BA^2$ is shown in Fig. 1 as connected to the lower end of the vertical body portion of the corresponding guide tube BA, by a horizontal upper end portion $BA^3$ and an intermediate, upwardly inclined portion which forms a portion of the outer wall of an inclined discharge channel F. At its upper end, the channel F opens laterally to the lower end of the vertical billet space between the guide tubes B and BA. At its lower end the channel F opens into a billet discharge space FA through which the billets roll out of the furnace structure and onto conveyor rolls G at the right hand side of the furnace.

To minimize heat losses, the outer side of the billet space FA is surrounded by a metallic door frame to the upper side of which a depending door FB is hinged so as to normally prevent the influx of atmospheric air into the space FA. As each billet $a$ is discharged from the furnace, it rolls down against the door FB and opens the latter sufficiently to permit the billet to pass out of the furnace structure and on to the receiving table or rolls G.

The walls of the furnace chamber A comprise body portions of ceramic material supported and held in place by a metallic framework, as is customary in the furnace art. The body portion of each of the side walls D of the furnace chamber A, in the desirable construction shown, is formed of horizontally disposed blocks E of ceramic material and square in cross-section. In the preferred construction shown, each of said blocks constitutes the body structure or shell of a furnace wall burner $e$ of the type disclosed and claimed in my prior Patent 2,215,079 of September 17, 1940, and now in extensive use. Such a burner is characterized by its provision for discharging a plurality of jets of a combustible mixture of air and gas into the bottom or outer end of a shallow cup-shaped combustion space $e'$ formed in the inner end of the corresponding block E and open at its top or inner end to the heating chamber A. The combustible jets discharged into the combustion space $e'$ are distributed about the axis of the latter, and are inclined away from that axis so that each jet burns alongside and in proximity to an adjacent sector shaped portion of the wall of the combustion space $e'$, which is thereby heated to incandescence. The combustible mixture burned in each combustion space $e'$ is supplied to the latter through the corresponding channelled burner body $e$ which is provided at its inner end with a circular series of discharge orifices through which the different jets are discharged into the corresponding combination space $e'$.

At the outer side of each of the side walls D of the furnace, supply piping including valves for separately regulating the rate at which the combustible mixture is supplied to each combustion space $e'$, or at least to each small group of adjacent combustion spaces $e'$, but such piping and valves need not be illustrated or described in detail herein since furnaces including such piping and valves are in extensive use, and have been shown in various prior patents, one of which is my prior Patent 2,409,431 of October 15, 1946.

The side walls D of the furnace structure are preferably separable to permit access to the furnace chamber A when desirable for inspection or repairs. To prevent leakage through the joints, at the ends of the furnace chamber between the portions of the end walls of that chamber attached to the side walls D, the armor or metallic framework at each end of each side wall section includes a metallic box-like part which may be water cooled, and extends into a recess in the corresponding masonry wall, and has a flat side adapted to abut against the corresponding flat side of the water box H included in the adjacent end portion of the other side wall structure.

To minimize heat loss at the upper end of the chamber, the furnace structure is formed with an upper hood portion I which overlies the portion of the guide tubes B' and billet pathway above those tube portions, and extends over the heating chamber. The hood portion I forms an extension of, and may be hinge-connected to the furnace structure. At its upper end, the hood I is provided with a metallic apron or shield I' extending into proximity with the subjacent billet on the guide tube portions B' and preferably adjustable toward and away from the tube portions B' to suitably restrict the pathway through which waste heating gases pass from the furnace chamber A into the external atmosphere.

The hood I is advantageously provided with a hinge connection $I^2$ to the right hand furnace side wall so that it may be tilted out of the position in which it extends over the upper end of the furnace chamber. When the hood is thus tilted out of its normal position, the furnace chamber may be inspected and some repair operations may be effected through the upper end of the chamber without cooling the furnace down and with only a brief interruption in its operation.

In the condition of the apparatus shown in Figs. 1 and 2, the row of billets is supported by the bottom wall of the furnace chamber A. As shown, that bottom wall is formed of ceramic blocks J which are channelled or spaced to provide horizontal slots for horizontal metallic bars or strips J', which have their upper edges flush with the tops of the blocks J, and which serve as skids directly engaging the lowermost billet $a$. Advantageously, the metallic skid parts J' include downwardly inclined portions which have their outer edges flush with the masonry forming the lower side wall of the inclined guideway F. Each metallic skid part J' is water cooled by a corresponding cooling tube $J^2$ imbedded in the masonry and having inlet and outlet end portions $J^3$ and $J^4$ extending vertically away from the underside of the furnace masonry.

The billet $a$, engaging the bottom wall of the furnace chamber, may be moved horizontally out of register with the guideway between the guide tubes B and BA and into the upper end of the guideway of the discharge chute F by suitable intermittently operating ejector mechanism. As will be observed, the lower ends of the vertical portions of the guide tubes BA and their horizontal portions $BA^3$, are elevated above the floor of the chamber A by a distance greater than the billet diameter, but appreciably smaller than twice the billet diameter. The ejector mechanism shown comprises two horizontally movable, water cooled plungers K, each of which is provided with a cooling water inlet K' and outlet $K^2$, and has its outer end connetced to the stem $K^3$ of a hydraulic cylinder $K^4$. As they are advanced to laterally displace the lowermost billet in the furnace chamber, the plungers K pass beneath the billet immediately above the billet being ejected. The weight of the stack of billets is thus taken by the two ejector plungers K as the lowermost billet is moved out of the position in which it supports the billets above it.

To prevent the stack of billets from dropping into engagement with the bottom wall of the furnace chamber when the plungers K are retracted, following each billet ejecting action, I advantageously provide vertical tubular plungers L which extend into the furnace chamber A through its bottom wall, and have their axes in the vertical plane midway between the guide tubes B and BA. Each plunger L is water cooled by means including a pipe L' axially disposed in the plunger and small enough to provide an annular flow passage between the outer wall of the pipe L' and the inner wall of the plunger L. In Fig. 1, $L^2$ and $L^3$ respectively designate the water inlet to a pipe L' and the water outlet from the annular space surrounding the pipe.

The lower ends of the plungers L are connected to a common crosshead LA secured to the upper end of the plungers LB of a hydraulic cylinder, not shown, but located in a well LC beneath the furnace structure. Said well is of sufficient depth, and the plungers LB and L are of sufficient length to permit the plungers L to extend to the upper end of the vertical guideway for the billets, when the furnace is being started into operation and contains no billets in said guideway. In filling the guideway with billets, the plungers L may be lowered slowly so that the billets passing off the guide rails B and into the vertical billet guideway as the plungers L are lowered, may be successively heated at or about the same rate as the billets are heated in regular operation as they pass downward in the guideway between the guide tubes B and BA.

In the normal operative condition of the apparatus shown in Figs. 1, 2 and 3, the guideway between the vertical portions of the guide tubes B and BA contains a vertical row or stack of billets, as shown in Fig. 1, and a number of billets are also held on the inclined upper guide tube portions B'. Except during intermittent intervals, the stack or vertical row of billets rests upon the ceramic blocks J and skids J', which form the floor of the heating chamber A. At intervals, the horizontal and horizontally movable plungers K are advanced to move the billet $a$ then engaging the heating chamber floor to the right, as seen in Fig. 1, so that said billet may drop into the downwardly inclined discharge passage F. The vertical depth or thickness of the horizontal plungers K is sufficient to prevent any down movement of the row of billets above the billet displaced while the plungers K are beneath said row.

After the lowermost billet is moved to the right of the line of movement of the vertical plungers L, and prior to the retraction of the plungers K, the plungers L are moved upward into engagement with the then lowermost billet in the vertical row and the weight of the vertical row of billets is transferred to the plungers L. After the plungers K have been retracted, vertical plungers L are lowered at the rate required to permit a suitably slow down movement of the vertical row of billets, which terminates without objectionable shock when the then lowermost billet in the row engages the floor of the chamber A. Thereafter, the plungers L are further lowered to prevent them from subjecting the lowermost billet to a cooling action during the period preceding the ejection of that billet into the discharge passage F. As the vertical row of billets is periodically lowered following the ejection of the bottom billet, the reserve billets on the inclined guide tube portions B' are given corresponding movements as a result of their gravitational bias.

In starting a billet heating furnace into operation initially, or after a shutdown period, the chamber A, or at least the upper portion of the latter, is heated up prior to the introduction of billets in the billet guideway between the vertical portions of the guide tubes B and BA. After the chamber A, or its upper portion at least, is sufficiently heated, one or more billets are fed into the vertical guideway above the plungers L, which then have their upper ends at, or above the level of the top of the chamber A. Thereafter, the plungers L are slowly lowered, and billets move off the inclined guide tube portions B' and into the vertical guideway and thereby form a vertical row which progressively increases in vertical extent until the lowermost billet in the row engages and rests upon the floor of the chamber A. Preferably, during the starting up period, the down movement of the plungers L is continued and the supply of fuel to the chamber A by the lower wall burners is so regulated that approximately normal furnace and billet temperatures are attained by the time the upper ends of the plungers L are lowered to the level of the heating chamber floor.

Advantageously, a stop bar LD is normally mounted in the furnace substructure in position to limit the upward movements of the cross-head LA and plungers L to the extent required to bring the lower ends of the plungers L into operative engagement with the billet directly above the horizontal plungers K when the latter are in their advanced position. The stop LD thus prevents the plungers L from moving upward far enough to raise the vertical row of billets above the ejector plungers K. The stop member LD is moved out of its normal position during the period in which the billets are being fed into the furnace as the latter is being started into operation, initially or after a shutdown period.

Since the supply of combustible mixture to each of the burners e may be independently regulated, and since the heat liberated in the operation of each burner is radiated directly to portions of the billets relatively close to the axis of the burner, it is practically possible to supply heat to the billets as required to bring each billet to its desired delivery temperature at the termination of the predetermined heating period for that billet. Furthermore, the billet heating periods, and consequently the rates at which billets are passed through the heating chamber A, are subject to wide variation in accordance with the conditions of operation. Thus, for example, a furnace of the general character shown in Figs. 1, 2 and 3, may be operated to heat billets at the rate of ten an hour during one day, and on the following day at the rate of five an hour, or at the rate of fifteen an hour. It will be understood, of course, that in any such variation in the billet output as from ten an hour to five an hour, or to fifteen an hour, the supply of combustible mixture to the different wall burners e should be varied more or less gradually so as to avoid temperature shock and improper billet heating during the transition from one output rate to the other.

The individual regulation of the fuel supplied to the different burners, and the relatively large portion of the heat liberated by each burner which is transmitted to a small portion of the wall of billets directly facing the burner, makes possible a close control of the rate at which heat is transferred to the billets at any and all levels. In consequence of such close control of the rate at which heat is transmitted to the billets at the different levels, it is practically possible to properly heat billets in substantially less time than is required to properly heat the same billets in any fuel burning billet heating furnace heretofore in use, of which I have knowledge, with a corresponding improvement in the characteristics of each billet.

In some cases it is desired to heat billets of various compositions to different temperatures. This is possible with the present furnace by the adjustment of the burners in various horizontal rows in accordance with the temperatures of the different billets as they move through the furnace. To this end, a temperature responsive element—such as an optical or radiation pyrometer may be sighted on the billets as they are passing through the furnace. As the temperatures of the individual billets are measured the burners in the corresponding portions of the furnace may be adjusted either automatically or manually to increase or decrease the heat supply, as the case may be, to bring a particular billet to a particular temperature. The ability to bring different billets to different temperatures as they are passing through the same furnace at the same time is of considerable importance in the continuous processing of metal in a modern steel plant.

The general principles of the present invention may be utilized in billet or bar heating furnaces differing in various respects from the furnace shown in Figs. 1, 2 and 3, and a number of different embodiments of the invention are shown in Figs. 4–13.

Figure 4:
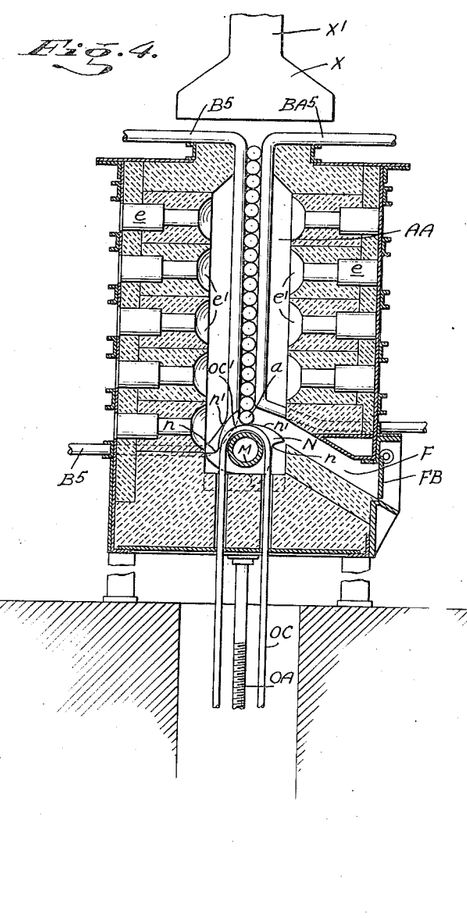
Fig. 4 is a sectional elevation of a furnace.
Figure 5:
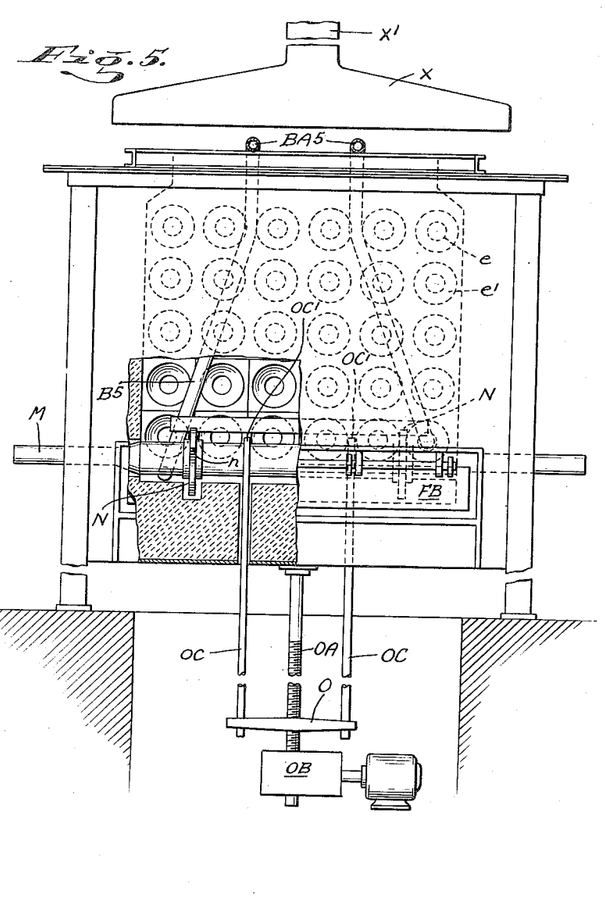
Fig. 5 is an elevation taken at right angles to Fig. 4 and with parts broken away and in section.

The furnace shown in Figs. 4 and 5 was primarily devised and is adapted for use in heating relatively small bars such as automobile cam shaft blanks to forging temperatures. In the furnace shown in Figs. 4 and 5, the bars are heated while moving downward in a vertical guideway in a vertical heating chamber AA, in substantially the same manner and by substantially the same means as the bars are heated in the chamber A of Figs. 1, 2 and 3. However, the means shown in Figs. 4 and 5 for ejecting the work pieces from the furnace are quite different from the work piece ejecting mechanism shown in Figs. 1, 2 and 3. In Figs. 4 and 5, the lowermost bar $a$ in the chamber AA is ejected by the partial rotation of a water cooled tubular shaft M. The latter carries and rotates a pair of spaced apart disc-like members N, each formed with a plurality of notches $n$, equally spaced about the axis of the shaft M, the notches $n$ in the two discs N being similarly spaced. As shown, there are four notches $n$ in each disc.

In the stationary condition of the shaft M, normally maintained except during the periodical ejecting operations, each of the discs N has one of its notches $n$ uppermost and receiving the corresponding longitudinal portion of the lowermost bar of the vertical row of bars $a$ between the water cooled guide tubes $B^5$ and $BA^5$. When the shaft M is given a quarter turn, the bar supported in the upper notches is moved laterally away from the vertical guideway between the tubes $B^5$ and $BA^5$, and is lowered sufficiently to permit the bar to move under the action of gravity out of the notches $n$ and into the downwardly inclined heated bar outlet FB. As shown, the peripheral edges $n'$ of the portion of each disc N between each two adjacent notches $n$ has a radius of curvature which decreases in the counterclockwise direction, as seen in Fig. 4. In consequence, as the shaft M is given a quarter turn in the clockwise direction away from the position shown in Fig. 4, the bars remaining in the vertical guideway are supported and gradually lowered by the disc edges $n'$ until the then lowermost bar in the row is received in the trailing notches $n$ of the two discs.

In the arrangement shown in Figs. 4 and 5, the shaft M is given no movement other than its intermittent rotative, bar ejecting movements, which may be effected by use of any one of known forms of mechanism which may be external to the furnace and need not be illustrated herein. To charge the furnace shown in Figs. 4 and 5 with billets or bars preparatory to putting the furnace into operation initially, or after a shutdown, use is made of an elevator structure comprising a cross-head O in threaded engagement with a vertical screw shaft OA. The latter is centrally disposed beneath the furnace structure and is adapted to be reversibly rotated by a suitable motor driven mechanism OB to raise and lower the cross-head. The elevator structure comprises a pair of water cooled pipes OC, each in the form of an inverted U and having its vertical legs secured to the cross-head O at opposite sides of the central plane through the furnace which is transverse to the lengths of the bars $a$.

In the normal operative condition of the apparatus, the upper yoke portions OC' of the pipes OC which extend over the tubular shaft M, are below the level of the bar $a$ which is directly supported in the notches $n$ of the discs N. In charging the furnace when empty, the screw shaft OA is rotated to elevate the cross-head O and thereby the elevator pipes OC until their yoke portions OC' are at the top of the furnace chamber. Billets $a$ are then put into the upper end of the vertical guideway between the guide tubes $B^5$ and $BA^5$ and engage and are supported by the yoke portions OC' of the tubes OC. The latter then act as for supporting struts. Thereafter, the shaft OA is rotated to slowly lower the cross-head O, tubes OC and the vertical row of bars $a$ into the guideway between the guide tubes $B^5$ and $BA^5$. The vertical extent of said row increases as the elevator is lowered.

As shown in Fig. 5, the lower portion of the tube $B^5$ and the tube $BA^5$ at each side of the above-mentioned central plane, is horizontally displaced from said plane to different distances at different levels. With the disposition of the guide tubes shown in Fig. 5, the portion of each billet or bar $a$ subject to the direct cooling action of the guide tube, shifts longitudinally of the bar as the latter moves downward in the furnace chamber, so that any tendency to the formation of objectionable local "cold spots" on the bars $a$ is substantially eliminated. As shown in Figs. 4 and 5, the heating gases escaping from the upper end of the heating chamber AA, pass into a collector or hood X having a stack or stack connection pipe X'.

Figure 6:
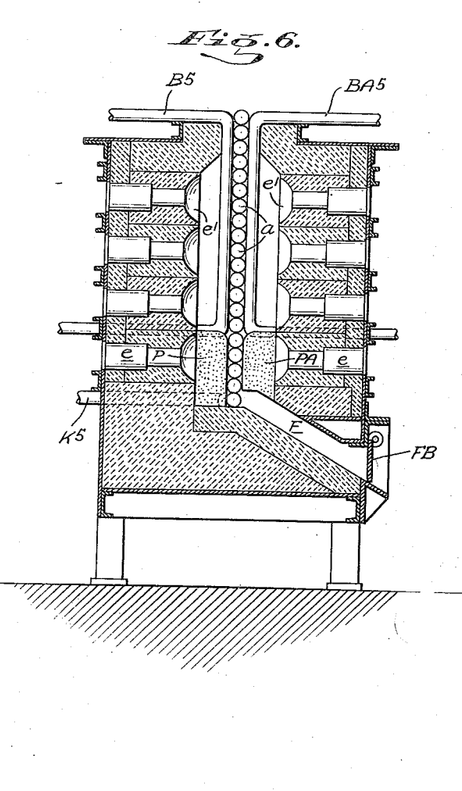
Figs. 6 and 7 are views taken similarly to Figs. 4 and 5 illustrating another form of furnace specially adapted for use in heating relatively small bars or rods to a forging temperature.
Figure 7:
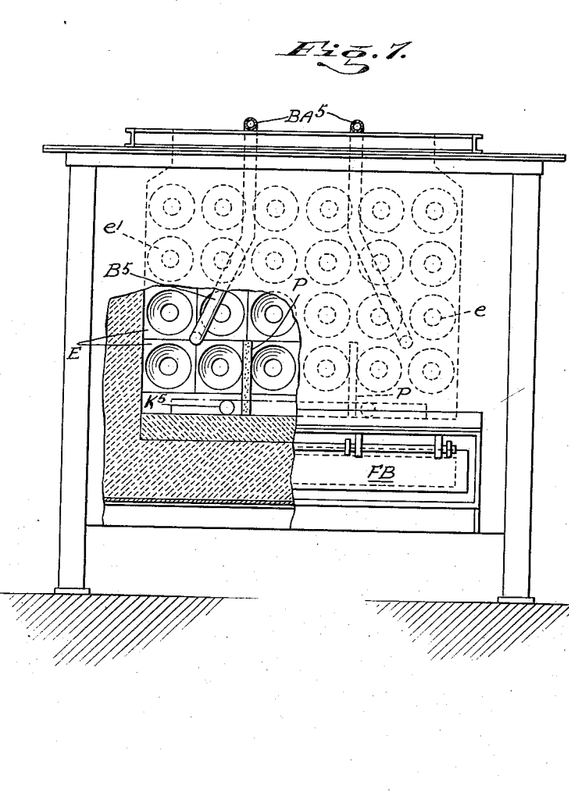

Figs. 6 and 7 illustrate a furnace form especially designed and adapted for heating bars or billets of relatively small size, such as automobile crank shaft blanks, to forging temperature. The furnace shown in Figs. 6 and 7 is quite similar to that shown in Figs. 4 and 5, except in respect to its billet ejecting mechanism, its provisions for substantially eliminating risk of "cold spots" due to contact of the water cooled guide tubes with the bars when the latter are highly heated, and in the omission of special means for charging the furnace with billets preparatory to starting the furnace into operation.

In Figs. 6 and 7, the risk of billet "cold spots" due to contact of the billets while at or near their maximum temperatures, is avoided by terminating the lower end of the portion of the guideway for the bars $a$ formed by the water cooled guide tubes $B^5$ and $BA^5$, at a level above the lowermost furnace wall burners E, and using blocks P and PA of refractory material to form the portion of the vertical guideway below said tubes. The refractory blocks P and PA extend transversely to the row of bars $a$ at the opposite sides of said row, and are built into the furnace structure, with the inner edges of the blocks P and PA in approximately the planes respectively including the corresponding sides of the tubes $B^5$ or $BA^5$. As shown, the blocks PA differ from the blocks P only in having their lower end shaped to form upper portions of the wall of the discharge conduit F. As those skilled in the art will recognize, the blocks P and PA may advantageously be formed of some suitable refractory material such as silicon carbide, which is adapted to withstand high temperatures and has relatively good heat conductivity when highly heated.

In lieu of the rotating billet ejector shown in Figs. 4 and 5, the furnace shown in Figs. 6 and 7 is provided with ejector plungers $K^5$ which are horizontal and horizontally movable, and which may be actuated and operate substantially as the plungers K of Figs. 1–3 are actuated and operated.

In initially charging billets of relatively small size into a furnace having a heating chamber of the vertical extent of only two or three feet or so, the billets may be lowered into place in the heated furnace by manually operated tongs, or in various other ways. Moreover, it is possible to charge such a furnace while cold, or at a relatively low temperature, with suitable dummy bars not intended to be forged or rolled after being heated, and to replace such dummy bars, one at a time, when the furnace is properly heated, by the billets $a$ to be rolled or forged after being heated.

Figures 8, 9, 10, 10A, 11, 11A:
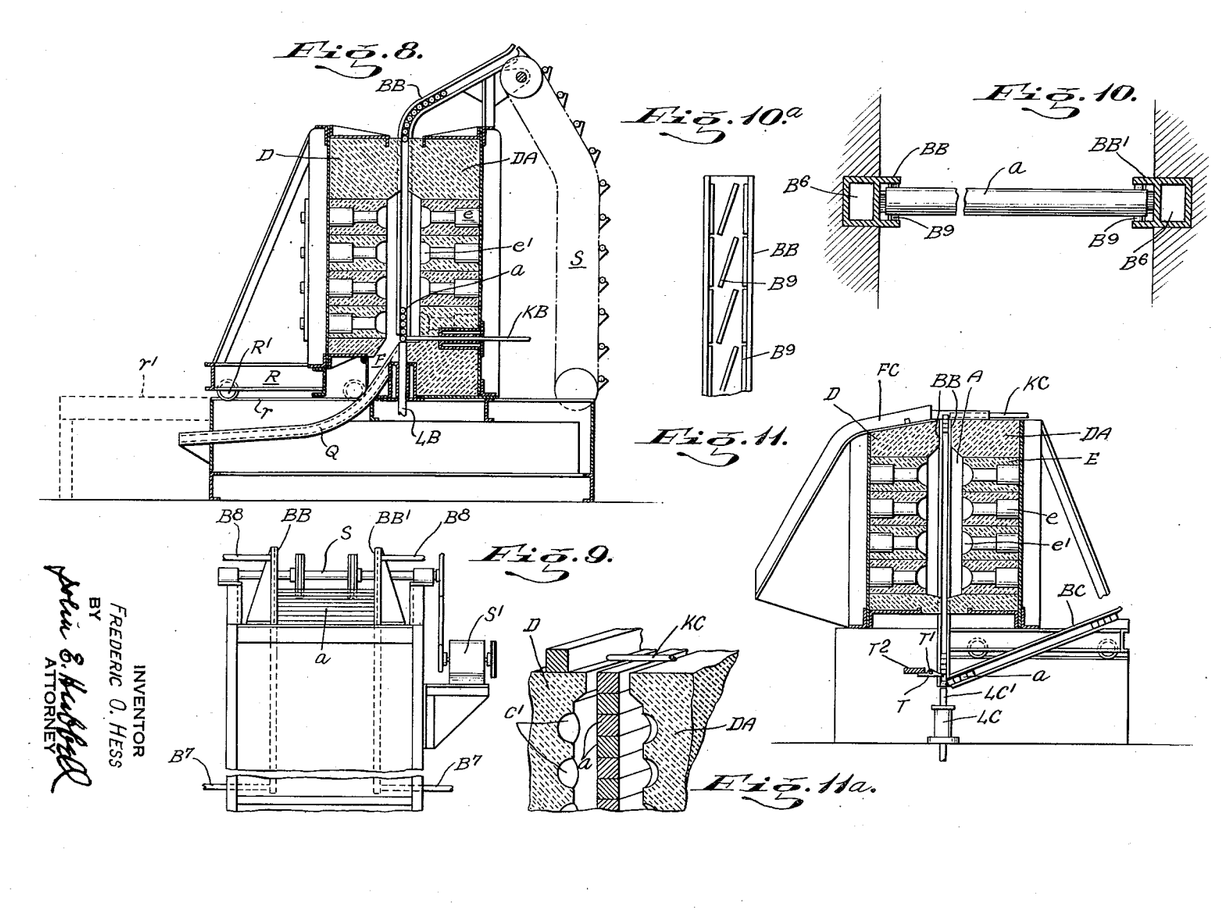
Fig. 8 is a sectional elevation of a third form of furnace specially adapted for use in heating relatively small bars and rods to a forging temperature.
Fig. 9 is an elevation taken at right angles to Fig. 8 showing an upper portion of the furnace structure shown in Fig. 8.
Fig. 10 is a horizontal section through the work guides included in the furnace shown in Figs. 8 and 9.
Fig. 10a is an elevation of a portion of one of the work guides shown in Fig. 10.
Fig. 11 is a sectional elevation of a furnace specially devised for use in heating relatively small rods or bars to a forging temperature and characterized by the movement of the work pieces upwardly through the furnace.
Fig. 11a is a perspective view on a scale larger than Fig. 11, diagrammatically illustrating a portion of the furnace shown in Fig. 11.

Figs. 8, 9, 10 and 10$a$ illustrate a furnace especially devised for heating relatively small billets or bars of substantially uniform length to forging temperatures, which does not differ significantly in construction or general mode of operation from the apparatus shown in Figs. 1, 2 and 3, except in the form of the water cooled guides BB and BB' employed to guide the billets into the vertical heating chamber and in their vertical movement down through the heating chamber. As shown in Figs. 8, 9, 10 and 10a, there is one guide BB at one of the narrow sides of the billet pathway, and one guide BB' at the opposite narrow side of the guideway. The cross-section of each guide is essentially that of a channel bar having its base portion thickened and formed with cooling water channel or duct $B^6$. The ends of each bar $a$ in the furnace are received in the channels of the two guides, as shown in Fig. 10. The guide BB' differs from the guide BB only in that, as a result of their inclined upper end portions, one guide is a "right hand" part and the other a "left hand" part. The passageways or water ducts $B^6$ in the guide members BB and BB' receive cooling water at their lower ends through supply pipe connections $B^7$, and discharge cooling water at their upper ends through outlet pipes $B^8$.

To minimize the cooling action of the guides BB and BB', the portion of each guide, including the duct $B^6$, is advantageously embedded in the corresponding masonry walls of the furnace chamber, and the bar receiving channel of each guide is advantageously provided with ribs or projections $B^9$ spacing the inserted end portions of the bar away from the flat sides of the channel, as shown in Figs. 10 and 10a. Each rib or projection $B^9$ may well be in the form of a metal spacer bar or strip of relatively small cross-section which is welded to the corresponding flat wall of the bar receiving channel of the corresponding guide members BB and BB'. Advantageously, and as shown in Fig. 10a, the projection strips $B^9$ may each have a length which is only three or four times the diameter or vertical thickness of the bars $a$ passing through the furnace, and are each inclined to the general length of the guide, so that as each bar is moved through the furnace chamber the portions of its surface in engagement with the spacing bars $B^9$ will vary and thereby avoid objectionable "cold spot" action.

The ejector mechanism shown in Fig. 8 comprises horizontal plungers KB and vertical plungers LB, which may be actuated and operate in substantially the same manner as the plungers K and L shown in Figs. 1, 2 and 3, are actuated and operate. As shown in Fig. 8, the billets $a$ discharged into the billet outlet passage F move through the latter and laterally away from the furnace, on water cooled guide rails Q.

As previously indicated, provisions may be made for separating the side walls D and DA of a heating chamber constructed in accordance with the present invention, to permit access to the heating chamber for inspection and repair. To this end, in the furnace shown in Fig. 8, the left-hand furnace side wall D is mounted on a carriage R having wheels R' running on a horizontal trackway including a portion $r$ which is a permanent portion of the furnace substructure, and on a removable section $r'$ shown in dotted lines in Fig. 8. As shown, a conveyor mechanism S including a driving motor S' is employed to move billets, one at a time, into the open upper end of the guideway formed by the guide members BB and BB'.

In Fig. 11, I have rather diagrammatically illustrated a form of the invention characterized by its provisions for passing billets being heated, upward instead of downward through the heating chamber A of the furnace. In the construction shown somewhat diagrammatically in Fig. 11, the billets are guided in their vertical movement through the furnace by guide members BB at the narrow sides of the billet pathway. Each of the guide members BB may be like the guide members BB and BB', shown in Fig. 10, except that they are straight from one end to the other. As shown in Fig. 11, the vertical row of horizontal billets and the guide members BB and BB' within the heating chamber extend from a level beneath the furnace to the upper end of the furnace structure. A billet is added to the lower end of the row of billets extending through the furnace of Fig. 11, and the entire row of billets is raised periodically by one or more hydraulic cylinders LC beneath the billet pathway and having upwardly extending plungers LC'. As indicated in Fig. 11, the billets to be added to the row of billets moving vertically upward pass into register with the lower end of guides BB through a downwardly inclined billet supply guideway BC. The latter may be formed by channel bars in which the ends of the bars $a$ are received.

The supply guideway BC has its lower end open and so positioned that when plungers LC' are at the level shown in Fig. 11, a billet may roll out of the guideway BC into the lower end of the vertical guideway formed by the channel bars BB. When thereafter, the plungers LC' are elevated, they extend across and prevent billets from moving out of the supply guideway BC, and move the billet last received from the guideway BC upward into engagement with the bar next above it. The last mentioned bar and the bars above it are held against down movement when the plungers LC' are lowered into the position in which the plungers LC are shown in Fig. 11, by a stop T. The latter, as shown in Fig. 11, is a latch or non-return pawl T pivoted to turn about a horizontal pivot T' and biased to turn clockwise into the horizontal position in which it is shown, and in which the tail of the same engages a stationary abutment $T^2$ and is thereby prevented from further clockwise rotation. In its normal position, the pawl T has its right end or nose portion extending into the vertical billet pathway formed by the guides BB, and into supporting engagement with the lowermost billet $a$ in the row of billets above the pawl level.

When the plungers LC are raised to add a billet to the lower end of the vertical row of billets above the pawl T, the latter is turned out of the path of the billet then directly engaged by the plungers LC', but swings back into its normal position as soon as the further upward movement of the last mentioned billet permits. As will be understood the non-return element T shown diagrammatically in Fig. 11, may take different forms and may be duplicated a number of times along the length of the bars which it engages.

As billets are added, one at a time, to the lower end of the row of billets above the non-return pawl T, heated billets are moved one at a time out of the furnace at its upper end. Each billet thus ejected from the furnace at the top of the latter moves away from the furnace along a downwardly inclined track or guideway FC. A horizontal ejector plunger may be provided at the top of the furnace to move the billets passing upward out of the furnace into the discharge guideway FC.

Upward movement through the furnace heating chamber of the vertical row of billets in the general manner provided for in Fig. 11, has special practical advantages when the billets are in the form of uniform rectangular bars. In such case, the vertical row of billets forms a stable structure as is plainly apparent in Fig. 11a, and the individual billets have no tendency to get out of line with one another and jam, or exert undue lateral pressure, against vertical guide surfaces. With an upward feed of the billets through the verical heating chamber, the feeding of the billets into the vertical guideway may be effected outside of the furnace structure and with the billets and the billet handling mechanism in a relatively cool condition. With a suitable disposition of the billet discharge pathway FC, no mechanism need be provided at the top of the furnace, although simple horizontally movable plungers KC at the top of the furnace, as shown in Fig. 11, may be advantageously employed in some cases. While a vertical row of billets, consisting of fifteen or twenty billets, one foot square in cross-section and sixteen feet or so long, weighs many tons, the aggregate weight of those billets is small in comparison with the force which hydraulic cylinders, used in steel rolling and bar forging mills, are frequently designed to provide.

Figures 12, 13, 14:
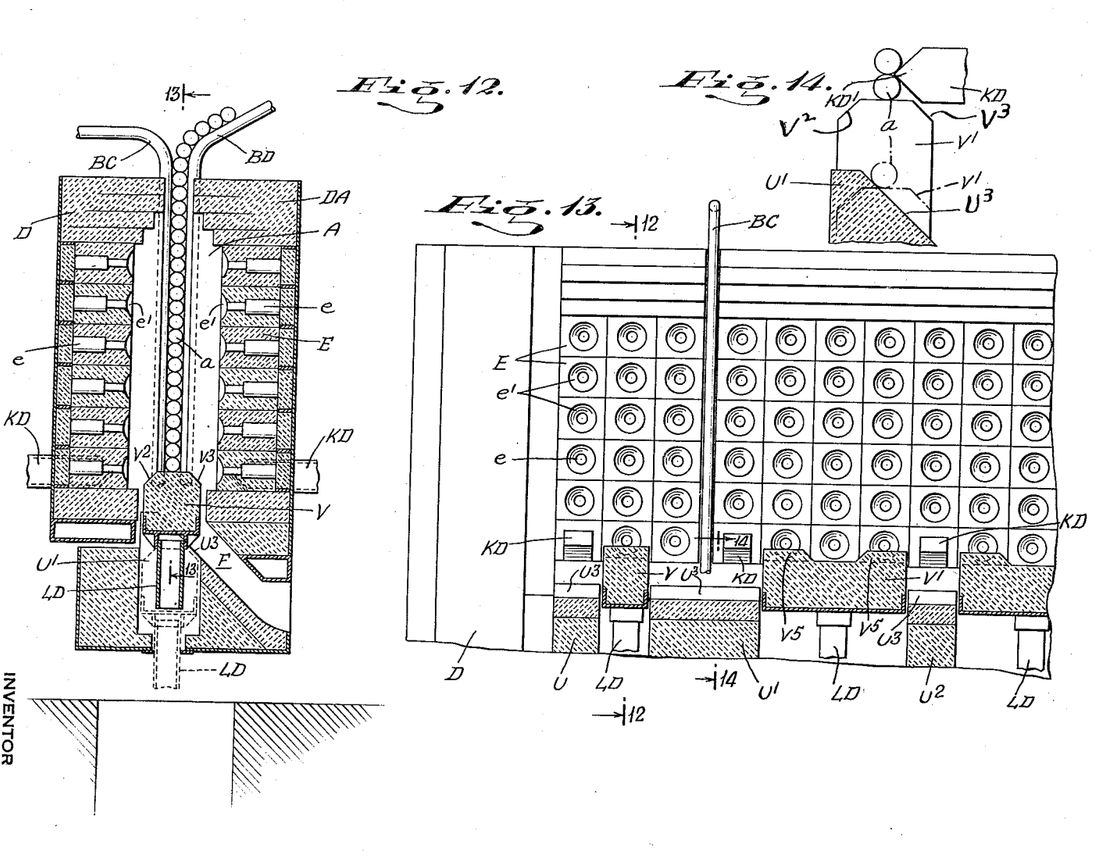
Fig. 12 is an elevation in section on the line 12—12 of Fig. 13, showing another form of furnace especially devised for heating relatively small bars and rods to a forging temperature.
Fig. 13 is a partial section on the line 13—13 of Fig. 12.
Fig. 14 is a view taken on line 14—14 of Fig. 13.

The billet heating furnace shown in Figs. 12, 13 and 14 was devised for use in heating a vertical row of superposed horizontal billets moving downward in a guideway formed by water cooled tubes BC and BD. The latter need not differ significantly in form or disposition from the tubular guides B and BA of Fig. 1, but as shown, the end portions of the tubes BC and BD differ from the end portions of the tubes B and BA. As will be understood, however, the billet guide construction illustrated in Figs. 10 and 10a may be used in lieu of tubular guides shown in Figs. 12 and 13, or in any of the furnaces shown in Figs. 1–7. The billet furnace shown in Figs. 12 and 13 is of essentially the same type as the furnace shown in Figs. 1, 2 and 3, except in respect to the means for discharging billets at the bottom of the heating chamber A and for supporting and lowering the superposed billets remaining in the furnace following each billet discharge operation.

The furnace shown in Figs. 12 and 13 comprises a hearth at the lower end of the heating chamber A. The hearth is formed of aligned, longitudinally displaced stationary sections U, U', U$^2$, etc. In the particular furnace design shown, the stationary hearth includes two sections (not shown), located at the right of the section U$^2$, and which correspond in form and disposition to the sections U' and U, shown at the left of the center section U$^2$. Between each pair of adjacent stationary hearth sections U and U' is a movable hearth section V, and between each adjacent pair of hearth sections U' and U$^2$, is a vertically movable hearth section V'. The movable hearth sections V and V' are supported on vertical and vertically movable plungers LD. Each of those plungers may be connected at its lower end to the piston of a hydraulic plunger or other elevator mechanism operable to raise and lower the corresponding plunger LD and the movable hearth sections supported by the latter. The stationary and movable hearth sections each comprises a relatively massive block of ceramic material mounted on a metallic supporting element. Each hearth section has a horizontal width substantially greater than the billet thickness or diameter, as is clearly shown in Fig. 12.

In normal operation, the removable hearth sections V and V', etc. occupy their elevated position shown in full lines in Figs. 12 and 13, and directly engage and support the lowermost billet $a$ in the furnace and thereby support the remaining billets in the furnace. In the course of each billet discharging operation, the movable hearth sections are lowered from their full line position shown in Figs. 12 and 13 to their position indicated by dotted lines in Fig. 14, and are thereafter returned to their full line position. During the initial portion of the down movement of the movable hearth sections in each discharge operation, auxiliary billet supporting means, shown as comprising horizontally movable members KD, are moved into position to directly engage and support the billet $a$ immediately above the lowermost billet $a$ which is directly supported on the movable hearth sections. After the members KD are thus brought into engagement with the lowermost but one, of the billets $a$ then in the furnace, the weight of that billet and of the billets above it, is borne by the devices KD until after the billet then directly supported on the movable hearth sections is discharged from the furnace through its discharge passage F, and until the movable hearth sections are thereafter returned to their normal positions. Thereafter, the members KD are retracted, and the movable hearth sections V, V', etc. remain stationary and carry the weight of all billets $a$ in the furnace, until the next billet discharging operation is under way.

In the preferred construction shown, the upper end portion of each of the stationary hearth sections U, U', U$^2$, etc. is bevelled off to form a surface U$^3$ inclined to the horizontal, and forming upward extensions of the lower wall of the inclined billet discharge channel F. The left and right hand upper corner edges V$^2$ and V$^3$ of each movable hearth section are similarly bevelled off. As shown, the angle of inclination to the horizontal of the corner edge surfaces V$^3$ and the surface U$^3$ are the same, so that in the lower positions of the movable hearth sections the surfaces V$^3$ are flush with the surfaces U$^3$. The inner ends KD' of the plungers KD are in the form of blunt wedges with horizontal apices parallel to the bars $a$ in the furnace. As shown, the lower sides of the wedge shaped ends of the plungers KD are inclined to the horizontal at angles similar to the angles of inclination of the adjacent hearth corner edges V$^2$ and V$^3$, so that as each plunger end KD' is moved toward the center of the furnace chamber while the movable hearth sections are being lowered, each of the plungers KD may operatively engage a portion of the underside of the bar $a$ immediately above the billet resting on the movable hearth sections after a down movement of the movable hearth sections and of the vertical row of billets $a$ equal to the thickness or diameter of the billet $a$ being discharged. As the movable hearth sections continue their down movement, after down movement of all of the billets above the lowermost billet is arrested by the plungers KD, the lowermost billet engages the inclined stationary hearth surfaces U$^3$ and the latter cams the billet to be discharged off the horizontal top surface of the movable hearth sections and the billet rolls into and through the discharge passage F. Thereafter, the movable hearth portions are returned from their lower dotted line position to their normal upper full line position, and the members KD are withdrawn from the furnace chamber into the position shown in Fig. 12.

As shown, the plungers KD are horizontally disposed and extend transversely to the length of the billets $a$ in the furnace. Each plunger KD is mounted in one or the other of two side walls of the furnace, in a passage in which the plunger is movable in the direction of its length between a retracted position in which its inner end KD' is within the corresponding furnace wall, and at some distance from the inner face of the wall, as is shown in Fig. 12. The plungers KD may be moved in the direction of their length by fluid pressure cylinders like the cylinders $K^4$ shown in Fig. 1.

The elevator mechanism including the plungers LD of Figs. 12 and 13, may be arranged to move the movable hearth sections V, V', etc. to the top of the heating chamber A, preparatory to filling the guideway between the guide tubes BC and BD with billets. However, in the form of the invention shown in Figs. 12 and 13, as well as in the other forms shown in which the billets are fed into the heating chamber at its upper end, it is not necessary to give the billet discharge mechanism the capacity for vertical movement needed to permit use of said mechanism in charging billets into an empty furnace. On the contrary, the capacity for vertical movement of the discharge mechanism may be limited to the amount required for the billet discharging operation, and other provisions may be made for charging the furnace with billets. It is practically feasible in charging a furnace with billets, to lower the billets into the furnace by the use of wire or cable swings. When temperature and operating conditions make it desirable, the furnace may be initially charged with dummy metal or ceramic billets or bars, which are successively replaced by billets or bars to be rolled or forged, as required to establish the normal furnace and billet temperature conditions.

As shown, the movable hearth section V is relatively short and the upper end portion of each longer movable hearth section V' is divided into two relatively short billet supporting elements $V^5$. Since the movable hearth sections normally occupy their elevated positions shown in Figs. 12 and 13, their upper portions are subjected to essentially the same heating action to which the lower billet is subjected. In consequence, the engagement of the movable hearth sections with the lowermost billet in the furnace does not tend to chill the latter and create cold billet spots.

Figure 15:
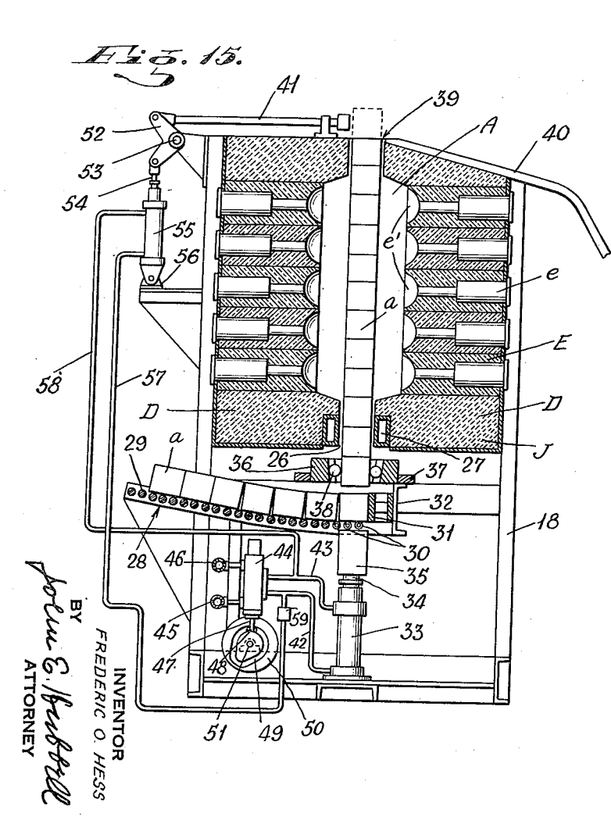
Fig. 15 is a sectional elevation illustrating another form of the invention.
Figure 16:
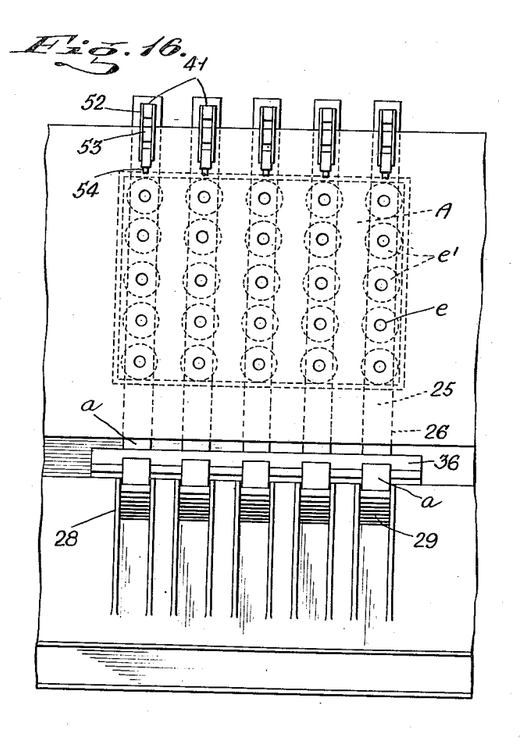
Fig. 16 is an elevation as seen from the left side of Fig. 15, with parts broken away.
Figure 17:
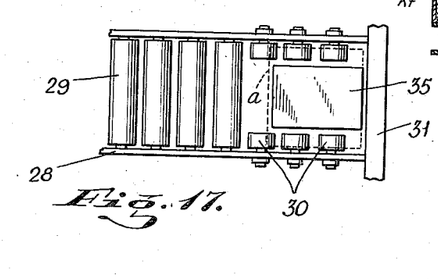
Fig. 17 is a fragmentary plan view of one of the roller conveyor units shown in Fig. 16.

In Figs. 15, 16 and 17 there is shown another form of the invention, somewhat similar to that of Figs. 11 and 11a, but including a synchronized billet loading and ejecting mechanism intermittently moving billets into the heating chamber A at its lower end and intermittently discharging them at the upper end of said chamber. That mechanism is adapted for use with little or no change in a furnace arranged to heat billets arranged in a single vertical stack. However, the furnace shown in Figs. 15, 16 and 17 is especially devised for heating short billets or slugs arranged in a plurality of vertical stacks with the axes of the billets in the different stacks all in or near the vertical plane parallel to and midway between the heating walls D at the opposite sides of the heating chamber A. Since the chamber is considerably longer than it is wide, the chamber in effect forms a relatively narrow vertical channel or passage through which the billets pass. The floor of the heating chamber A is formed with a number of spaced apart openings or inlets 26 through each of which the billets $a$ forming the corresponding vertical stack enter the bottom part of the chamber A. At each inlet 26 is provided an annular-shaped hollow collar 27 through which a cooling liquid is circulated in any suitable manner (not shown) to prevent overheating of the billet feeding mechanism by the heated furnace gases passing from the chamber through the inlets.

The billet feeding mechanism comprises a number of inclined roller conveyors 28, one for each of the inlets 26, upon which the billets $a$ are placed and moved downwardly by gravity to regions immediately beneath the respective inlets 26.

Each roller conveyor 28 includes first sections at which the billets are supported by full length rollers 29 and second sections immediately beneath the corresponding inlet 26 at which the billets are supported at the side edges only of the conveyor by stub rollers 30. When each billet moves onto the second section of a roller conveyor 28, it comes to rest against a stop member 31 which is welded to a channel 32 forming part of the framework 18.

Beneath the stub roller sections of the conveyors and in alignment with the inlets 26 are mounted upright hydraulic cylinders 33. The cylinders 33 are of a conventional type within which are disposed movable pistons (not shown) connected to cylinder rods 34 which extend upwardly through the ends of the cylinders. To the upper ends of the cylinder rods 34 are fixed metal blocks or rams 35 which are of such size that they can move through the second stub roller sections of the roller conveyors, as best shown in Figure 17.

When the rams 35 move upwardly they contact and engage the bottoms of the billets $a$ bearing against the stop member 31. With continued upward movement of the rams 35 the billets $a$ supported by the stub rollers 30 are lifted from the roller conveyors and raised against the bottom billets in the upright stacks.

Such bottom billets of the upright stacks are locked in position in openings formed in a holding member secured to parts 37 welded to parts of the framework 18. Balls 38 are held in races at the inner inclined faces of the openings in the member 36 and are instantaneously released and moved upwardly when the billets $a$, being raised from the roller conveyors 28 by the rams 35, engage the bottom billets of the upright stacks and move the latter upwardly.

The upward stroke of each cylinder rod 34 is of such length that the billets pass through the members 36 when lifted from the roller conveyors 28. When each cylinder rod 33 reverses its direction of movement and the ram 35 thereafter moves downwardly, the balls 38 move downwardly in their races and instantaneously lock the raised billet in the annular-shaped member 36. In this manner successive billets are moved from each roller conveyor 28 toward the inlet 26 immediately above it, and, after each billet is raised a sufficient distance, it becomes the bottom billet of a vertical stack of billets held in an upright position at the annular-shaped member 36.

After passing through the opening in the roller conveyor 28 adjacent to the stop member 31, each ram 35 acts to hold back the billets 25 on the roller conveyor. When the ram 35 subsequently moves downwardly and passes below the stub rollers 30, the billets are then free to move by gravity on the roller conveyor 28 until the end billet comes to rest against the stop member 31.

When a billet $a$ is raised from one of the roller conveyors 28 and becomes the bottom billet in an upright stack, the top billet in the stack is raised through an outlet 39 at the upper part of the chamber A to a position adjacent to the upper end of a chute 40.

Push rods 41 are provided at the top of the billet heating furnace and are intermittently actuated to push onto the chutes 40 the heated billets of the different stacks raised outside the furnace chamber A. The chutes 40 leading from the several outlets 39 at the upper part of the chamber A may deliver the heated billets by gravity to the same forging machine or to different forging machines at which the desired forming operations are effected.

Each cylinder 33 is connected by conduits 42 and 43 to a valve control mechanism 44 to which oil or equivalent motive fluid is supplied under pressure through a conduit 45 from a source of supply and from which such fluid is returned through a conduit 46 to the source of supply. The valve control mechanisms, which may be disposed alongside one another, may be of any conventional type, such as that commonly referred to as a four-way valve mechanism.

Each valve control mechanism 44 is provided with a control member 47 which extends through an opening in an end wall thereof and is of such construction that, when the control member 47 is in its raised or upper position, oil under pressure is delivered from conduit 45 to say, the conduit 42, for example, at which time the other conduit 43 is in communication with the conduit 46 to return oil to the source of supply. Conversely, when the control member 47 is in its lower position, oil under pressure is delivered from conduit 45 to conduit 43, at which time conduit 42 is in communication with conduit 46 to return oil to the source of supply. Thus, oil under pressure may be supplied either through conduit 42 or conduit 43 to the bottom or top sides of the piston within the cylinder 33, respectively, depending upon the position of the control member 47.

In order to control and regulate the position of the valve control member 47, the lower end thereof is provided with a cam follower 48 which rides in a race 49, of a cam 50. The cams 50 preferably are connected to a common shaft 51 which is driven in any suitable manner, as through suitable speed reducing mechanism from an electric motor, for example. Each cam race 49 is of such shape that the control member 47 operatively associated therewith will be in its upper position for a part of the revolution of the cam, and the several cams 50 on the shaft 51 may be staggered so that the control members 47 of the different valve mechanisms 44 will be moved in succession to their upper positions.

Since each cylinder rod 34 of a cylinder 33 will be moved upwardly during the interval of time the control member 47 associated with such cylinder 33 is in its upper position, as just explained, it will be apparent that the billets $a$ will be raised in succession from the several roller conveyors 28 and that the stacks of billets will be raised in succession in the chamber A. Hence the billets $a$ will be successively raised in the several stacks to positions adjacent the upper ends of the chutes 40.

Each push rod 41 is actuated to push a heated billet $a$ onto the chute 40 immediately after it is lifted outside the heating chamber A. This is accomplished by pivotally connecting each push rod 41 to an arm of a bell crank 52 which is pivotally mounted, as indicated at 53. The other arm of each bell crank 52 is pivotally connected at one end of a cylinder rod 54 whose opposite end is fixed to a piston (not shown) movable within a cylinder 55 supported at 56.

The opposite ends of the cylinder 55 are connected by conduits 57 and 58 to the conduits 42 and 43, respectively. In the conduit 57 is connected a valve 59 of known type, usually referred to as a sequence valve, which is adjusted so that oil under pressure will pass from conduit 42 into conduit 57 only after the cylinder rod 34 approaches and reaches the upper limit of its movement and the full line pressure builds up in the conduit 42. When this condition occurs, at which time the stack of billets has been raised so that a heated billet is outside the heating chamber A adjacent the chute 40, oil will then pass through conduit 57 to the bottom part of the cylinder 55 and below the piston therein to raise the cylinder rod 54 and actuate the push rod 41 to push the raised billet onto the chute 40.

When oil is supplied under pressure through conduit 43 to the upper part of each cylinder 33, the direction of movement of the cylinder rod 34 is reversed and the ram 35 fixed thereto moves downwardly. When this occurs oil under pressure will also be supplied to conduit 58 and cause the cylinder rod 54 to move downwardly and return the push rod 41 to the position shown in Figure 1, so that the push rod will not interfere with the raising of the next heated billet at the top of the stack.

Figure 18:
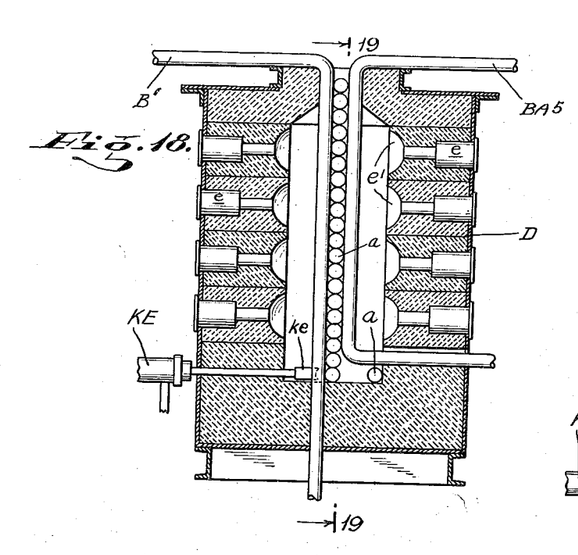
Fig. 18 is a sectional elevation of a portion of another form of billet heating furnace.
Figure 19:
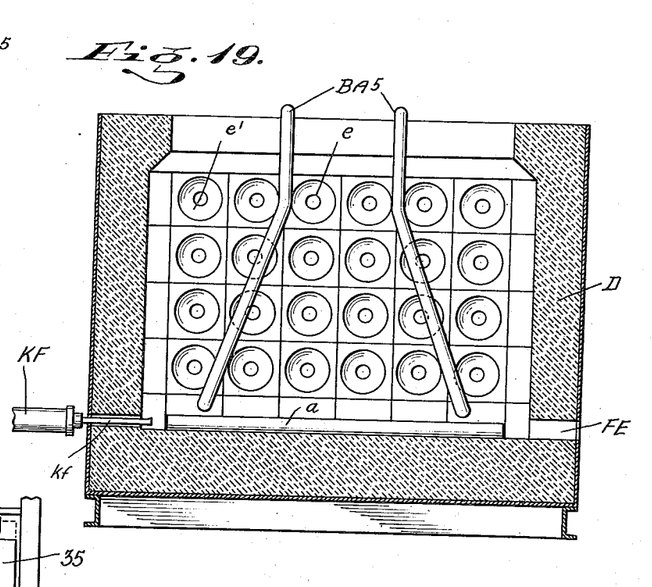
Fig. 19 is a vertical section taken on the line 19—19 of Fig. 18.

A still further embodiment of the invention is disclosed in Figures 18 and 19 which is generally like that shown in Figures 4 and 5, in that the hollow guides $B^5$ and $BA^5$ are in the form of pipes for guiding a stack of elongated bars downwardly through the heating chamber. In Figures 18 and 19 hydraulically operated cylinders KE like those described in Figures 1 and 2 are provided for intermittently pushing the billets sideways.

In addition, a hydraulically operated cylinder KF is provided at one end of the billet heating furnace whose cylinder rod $kf$ passes through an opening in an end wall and acts to push the displaced bottom billets lengthwise or axially through an outlet FE formed in the opposite end wall of the billet heating furnace.

The cylinder KF may be connected by conduits to the conduits adapted to supply motive fluid alternatively to the opposite ends of the cylinder KE, in the same manner as the cylinder 55 in Figure 15 is connected by conduits 57 and 58 to the conduits 42 and 43 for the cylinder 33. Further, a sequence valve like the valve 59 in Figure 15 may be connected in one of the conduits connected to an end of the cylinder KF, whereby the cylinder rod $kf$ will be actuated immediately after each bottom billet in the stack is moved sideways and displaced and when the full line pressure builds up in the conduit connected to move and actuate the rams $ke$ toward the stack of billets.

In the construction of furnaces embodying the characteristic features of the present invention, it is to be understood and assumed that the customary construction practices of the furnace art will ordinarily be followed in such matters as the selection of ceramic materials for use in different portions of the furnace which are appropriate to the temperatures and mechanical stresses to which they will be subjected, and in the provision of appropriate water cooling means wherever necessary or desirable to protect metallic parts of the furnaces from overheating.

In all the furnace forms shown, the heating chamber is open at its upper end for the discharge of products of combustion formed in the heating chamber. As indicated in the drawings, the discharge passages are smaller in cross-section than the heating chamber proper so as to minimize heat losses and to prevent movement of atmospheric air into the heating chamber. In some cases the escaping gases may pass directly into the atmosphere from the furnace chamber, but in other cases a collecting hood is arranged above the furnace outlet and is provided with a stack outlet.

In passing away from the furnace heating chamber, the heating gases give up heat to the entering billets or bars, so that the furnace gases passing away from the furnace are at temperatures substantially lower than the furnace gas temperatures. While it is possible to associate with the furnace, means such as are customarily employed in connection with many furnaces for recovering heat from the escaping furnace gases, it is thought that in the ordinary use of the invention, special waste heat recovery provisions will not be found necessary or practically desirable. It is to be noted that in the operation of furnace wall burners of the type described, the complete combustion of a combustible mixture containing substantially the proportions of air and fuel gas required for perfect combustion, is readily obtainable, so that the amount of heat carried out of the furnace by the furnace gases includes no heat utilized in raising the temperature of excess air.

The escaping gases from the top of the heating chamber may pass directly into the atmosphere from the furnace chamber, or when conditions make it desirable a collecting hood may be arranged above the furnace gas outlet and be provided with a stack connection, as is shown in Figs. 4 and 5.

In the normal operation contemplated of a furnace of any of the types and forms shown, the rate of combustion in the burners is so relatively high as to insure a heating chamber pressure somewhat in excess of atmospheric pressure. There is thus no significant tendency to the inleakage of air into the heating chamber with a corresponding addition of oxygen to the atmosphere in said chamber and a resultant increased scale formation. The rapid billet heating rate obtainable with and characteristic of the invention, contributes directly to a reduction in the percentage of scale produced, as well as to better metallurgical and mechanical characteristics of end products formed from the billets. While the time required for heating a billet in accordance with the present invention may vary with conditions through quite wide limits, and while the minimum practical heating period necessarily increases as the billet cross-section is increased, it is noted by way of illustration and example, that it is practically feasible to heat a steel billet ten inches in diameter from an initial atmospheric temperature of the order of 70° F. to a forging or rolling temperature of 2250° F., in a period of one hour.

This is not more than half the time required to similarly heat a billet of the same size in any billet heating furnace in practical use, of which I have knowledge.

In ordinarily practice, the tonnage output capacity of an individual furnace constructed for use in the practice of the invention may well vary from one or two tons up to twenty-five or more tons per hour, when the billets are being heated from atmospheric temperature to a delivery temperature of 2250° F. or so. Generally speaking, the time required to heat an individual billet or bar increases with the cross section of the billet or bar, and decreases as the temperature to which the billets or bars are to be heated, is lowered. It is practically feasible to construct and operate a furnace in accordance with the present invention for heating billets of relatively large size at a rate substantially greater than 25 tons per hour. It seems to be practically desirable, however, under plant conditions now prevailing, to limit the maximum output capacity of an individual furnace of about twenty-five tons per hour. This application is a continuation in part of my prior application, Serial No. 699,416, filed Sept. 26, 1946.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used without a corresponding use of other features.

Having now described my invention, what I claim as new and desire to secure by Letters Patent, is:

1. In a billet heating furnace, the combination of structure forming a rectangularly shaped, elongated furnace chamber extending in a vertical direction and having two oppositely disposed sidewalls and restricted openings at the top and bottom thereof through which billets may pass, a plurality of vertically displaced and horizontally extending rows of individual radiant type gas burners located in each of said side walls and forming a part thereof, each row being substantially the full width of the furnace chamber each of said burners supplying heat by radiation to the portion of the billets in front of the individual burners as said billets are passing through the furnace chamber, means to supply billets one after the other through one of said openings to form a stack of billets in the furnace chamber, and means to remove billets from said stack one at a time as they leave the furnace chamber at the other end thereof.

2. The combination of claim 1 in which means is provided to supply fuel individually to each burner, and means to regulate the supply of fuel to each burner whereby the desired heat pattern may be obtained in the furnace chamber.

3. In apparatus for heating billets and the like, structure forming a substantially rectangularly shaped, vertically extending furnace chamber and including a pair of oppositely disposed furnace walls and means forming entrance and exit openings smaller than said chamber at the opposite ends thereof respectively, said furnace walls being provided in the opposing faces thereof with a plurality of oppositely disposed radiant type gas burners, said burners being placed in horizontally extending, vertically displaced rows, the burners being substantially equal distances from opposite sides of the billets being heated, means to supply billets in side-by-side relation in a single row to the entrance opening to form a vertical stack of billets in the furnace chamber, and means to remove the billets one by one from the exit opening whereby additional billets can be moved through the furnace to be heated.

4. In apparatus for heating billets and the like, structure forming a vertically extending furnace chamber substantially rectangular in cross section and including a pair of oppositely disposed walls extending from the top to the bottom of said chamber, and means forming an entrance and an exit passage at opposite ends of said chamber, said passages being smaller than said chamber and forming the ends of a straight vertical heating path extending through said chamber, each of said walls having incorporated therein a plurality of radiant type gas burners, said burners being in vertically displaced rows with the burners of each row extending horizontally substantially the full width of the chamber and facing each other in the opposing walls, whereby billets passing through the chamber will be heated from end to end, means to adjust the burners in each row individually, means to supply billets one after the other through said entrance passage to form a stack of billets in said chamber, said billets being seated from opposite sides as they move through said chamber, and means to remove the billets from the stack as they leave said chamber through said exit passage.

FREDERIC O. HESS.

REFERENCES CITED

The following references are of record in the file of this patent:

UNITED STATES PATENTS

| Number | Name | Date |
| --- | --- | --- |
| 712,386 | Keiser | Oct. 28, 1902 |
| 957,998 | Parsons | May 17, 1910 |
| 1,659,550 | Steenstrup | Feb. 14, 1928 |
| 1,691,349 | Harrington et al. | Nov. 13, 1928 |
| 1,723,538 | Batie | Aug. 6, 1929 |
| 1,890,065 | Meehan | Dec. 6, 1932 |
| 1,915,949 | Peterson | June 27, 1933 |
| 2,146,410 | Vaughan | Feb. 7, 1939 |
| 2,214,421 | Kneass | Sept. 10, 1940 |
| 2,215,080 | Hess | Sept. 17, 1940 |
| 2,465,306 | Durand | Mar. 22, 1949 |